(12) United States Patent
Melcher et al.

(10) Patent No.: US 10,302,215 B2
(45) Date of Patent: May 28, 2019

(54) FLUID VALVE, IN PARTICULAR A RETURN VALVE FOR A PAINTING SYSTEM

(71) Applicant: Dürr Systems GmbH, Bietigheim-Bissingen (DE)

(72) Inventors: Rainer Melcher, Oberstenfeld (DE); Frank Herre, Oberriexingen (DE); Michael Baumann, Flein (DE); Thomas Buck, Sachsenheim (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 41 days.

(21) Appl. No.: 15/724,432

(22) Filed: Oct. 4, 2017

(65) Prior Publication Data

US 2018/0029062 A1   Feb. 1, 2018

Related U.S. Application Data

(60) Division of application No. 14/504,866, filed on Oct. 2, 2014, now Pat. No. 9,782,786, which is a
(Continued)

(30) Foreign Application Priority Data

May 6, 2009   (DE) ......................... 10 2009 020 064

(51) Int. Cl.
*F16K 31/12* (2006.01)
*F16K 31/122* (2006.01)
(Continued)

(52) U.S. Cl.
CPC ............ *F16K 31/122* (2013.01); *B05B 1/306* (2013.01); *B05B 1/3013* (2013.01); *B05B 12/14* (2013.01);
(Continued)

(58) Field of Classification Search
CPC ........ F16K 31/122; F16K 31/12; F16K 17/30; B05B 15/55; B05B 1/306; B05B 1/3013;
(Continued)

(56) References Cited

U.S. PATENT DOCUMENTS

| 3,052,444 A | 9/1962 | Kintner |
| 3,403,695 A | 10/1968 | Hopkins |

(Continued)

FOREIGN PATENT DOCUMENTS

| CH | 390686 A | 4/1965 |
| CN | 1332657 A | 1/2002 |

(Continued)

OTHER PUBLICATIONS

JPO Notification of Reasons for Rejection for JP2015/170094 dated Oct. 4, 2016 (11 pages; with English translation).
(Continued)

*Primary Examiner* — Ian G Paquette
(74) *Attorney, Agent, or Firm* — Bejin Bieneman PLC

(57) ABSTRACT

Exemplary illustrations of a fluid valve, e.g., a return valve for returning residual paint, rinsing agent, and compressed air from a paint line when changing color in a painting system, are disclosed. An exemplary fluid valve may be adjusted between an open position, in which the fluid valve is at least partially open, e.g., for rinsing a paint line with a rinsing agent and for pressurizing the paint line with a new color for the color change, and a closed position, in which the fluid valve is closed, e.g., for applying the new color after the color change. An exemplary fluid valve may switch to the closed position, upon actuation by the medium thereof, e.g., medium flowing through or present in the valve. In another example, a fluid valve may close depending on the fluid present at the input side.

6 Claims, 13 Drawing Sheets

Related U.S. Application Data continuation of application No. 13/319,156, filed as application No. PCT/EP2010/002763 on May 5, 2010, now Pat. No. 8,881,757.

(51) Int. Cl.

| | | |
|---|---|---|
| *B05B 12/14* | (2006.01) | |
| *F16K 17/30* | (2006.01) | |
| *B05B 1/30* | (2006.01) | |
| *B05B 15/55* | (2018.01) | |

(52) U.S. Cl.
CPC .............. *B05B 15/55* (2018.02); *F16K 17/30* (2013.01); *F16K 31/12* (2013.01); *B05B 1/3006* (2013.01); *Y10T 137/0318* (2015.04); *Y10T 137/4259* (2015.04); *Y10T 137/7736* (2015.04); *Y10T 137/7869* (2015.04); *Y10T 137/87869* (2015.04)

(58) Field of Classification Search
CPC . B05B 1/3006; B05B 12/14; Y10T 137/0318; Y10T 137/7869; Y10T 137/4259; Y10T 137/87869; Y10T 137/7736
USPC ......... 137/240, 467.5, 1, 517, 882; 427/201; 118/311; 239/570; 251/63.4, 63.6, 187, 251/324
See application file for complete search history.

(56) References Cited

U.S. PATENT DOCUMENTS

| | | | |
|---|---|---|---|
| 3,572,366 A | | 3/1971 | Wiggins |
| 4,465,093 A | | 8/1984 | Gold et al. |
| 4,524,793 A | | 6/1985 | Silverwater |
| 4,759,476 A | | 7/1988 | Pasbrig |
| 4,962,724 A | | 10/1990 | Prus et al. |
| 5,293,898 A | | 3/1994 | Masloff |
| 5,857,661 A | * | 1/1999 | Amada .................. F16K 7/075 137/467.5 |
| 6,062,247 A | | 5/2000 | King, Sr. |
| 6,715,506 B1 | | 4/2004 | Ikushima |
| 6,823,930 B2 | | 11/2004 | Wuthrich |
| 6,866,059 B2 | | 3/2005 | Griffin |
| 7,207,349 B1 | | 4/2007 | Yoshioka |
| 7,997,293 B2 | | 8/2011 | Ruschke |
| 8,028,606 B2 | | 10/2011 | Naito |
| 8,096,313 B1 | | 1/2012 | Kah |
| 8,881,757 B2 | | 11/2014 | Melcher |
| 2003/0056931 A1 | | 3/2003 | Wuthrich et al. |
| 2005/0221147 A1 | | 10/2005 | Shioya et al. |
| 2005/0287301 A1 | | 12/2005 | Ljubomirsky |
| 2008/0118652 A1 | | 5/2008 | Ageorges et al. |
| 2009/0145609 A1 | * | 6/2009 | Holmes ................... E21B 34/08 166/332.1 |
| 2013/0320109 A1 | | 12/2013 | Yamauchi |
| 2015/0268672 A1 | * | 9/2015 | Pechtold ................. F16K 17/30 137/505 |

FOREIGN PATENT DOCUMENTS

| | | |
|---|---|---|
| CN | 101146622 | 3/2008 |
| DE | 4012900 A1 | 11/1990 |
| DE | 4123147 A1 | 1/1993 |
| EP | 0902751 A1 | 3/1999 |
| EP | 1295655 A1 | 3/2003 |
| GB | 2159243 A | 11/1985 |
| JP | S59-501957 A | 11/1984 |
| JP | S63-187782 U | 12/1988 |
| JP | H01-171978 A | 7/1989 |
| JP | S63-068076 U | 12/1989 |
| JP | H11241686 A | 9/1999 |
| JP | 2001-324051 A | 11/2001 |
| JP | 2002310376 A | 10/2002 |
| JP | 2005009569 | 1/2005 |
| JP | 2005030473 | 2/2005 |
| JP | 2006189068 | 7/2006 |
| JP | 2006308105 | 11/2006 |
| JP | 2008246383 | 10/2008 |
| JP | 2009255538 A | 11/2009 |
| JP | 2010023618 A | 9/2010 |
| SU | 840508 A | 6/1981 |
| SU | 1383582 A1 | 6/1991 |
| UA | 78614 C2 | 4/2007 |
| WO | 9201184 A1 | 1/1992 |

OTHER PUBLICATIONS

Office Action for CN201410757008.2 from Chinese Patent Office dated Jun. 20, 2016 (6 pages).
EPO Office Action for Application No. 10721671.5 dated May 19, 2016 (2 pages).
Korean Intellectual Property Office Notice of Preliminary Rejection for Application No. 10-2011-702897 dated Apr. 18, 2016 (English translation; 10 pages).
Notification of Reasons for Rejection from the JPO for JP Patent Application No. 2012-508948; dated May 7, 2014 (English translation; 7 pages).
International Search Report for PCT/EP2010/002763 dated Jul. 26, 2010 (4 pages).

* cited by examiner

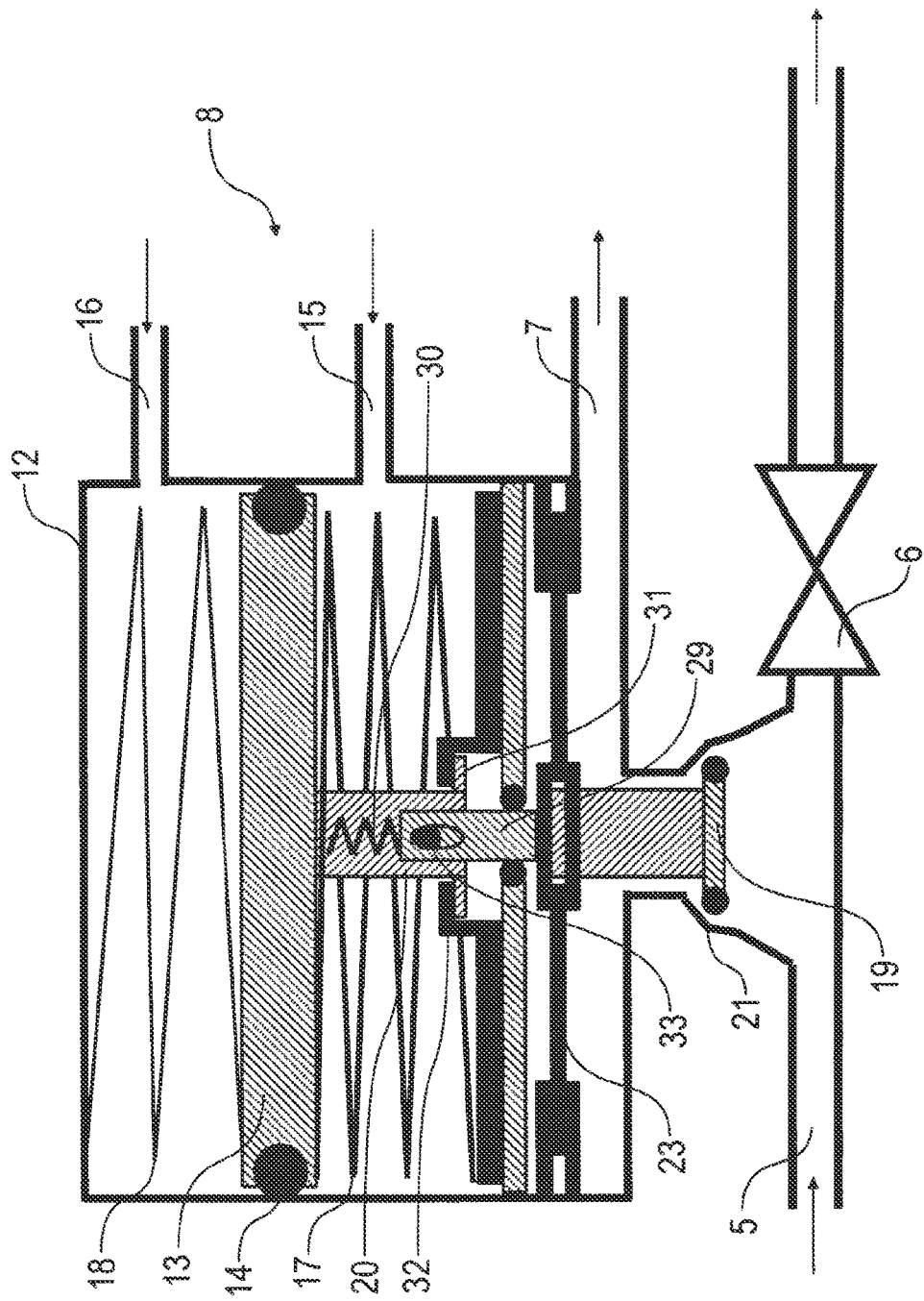

Closing position

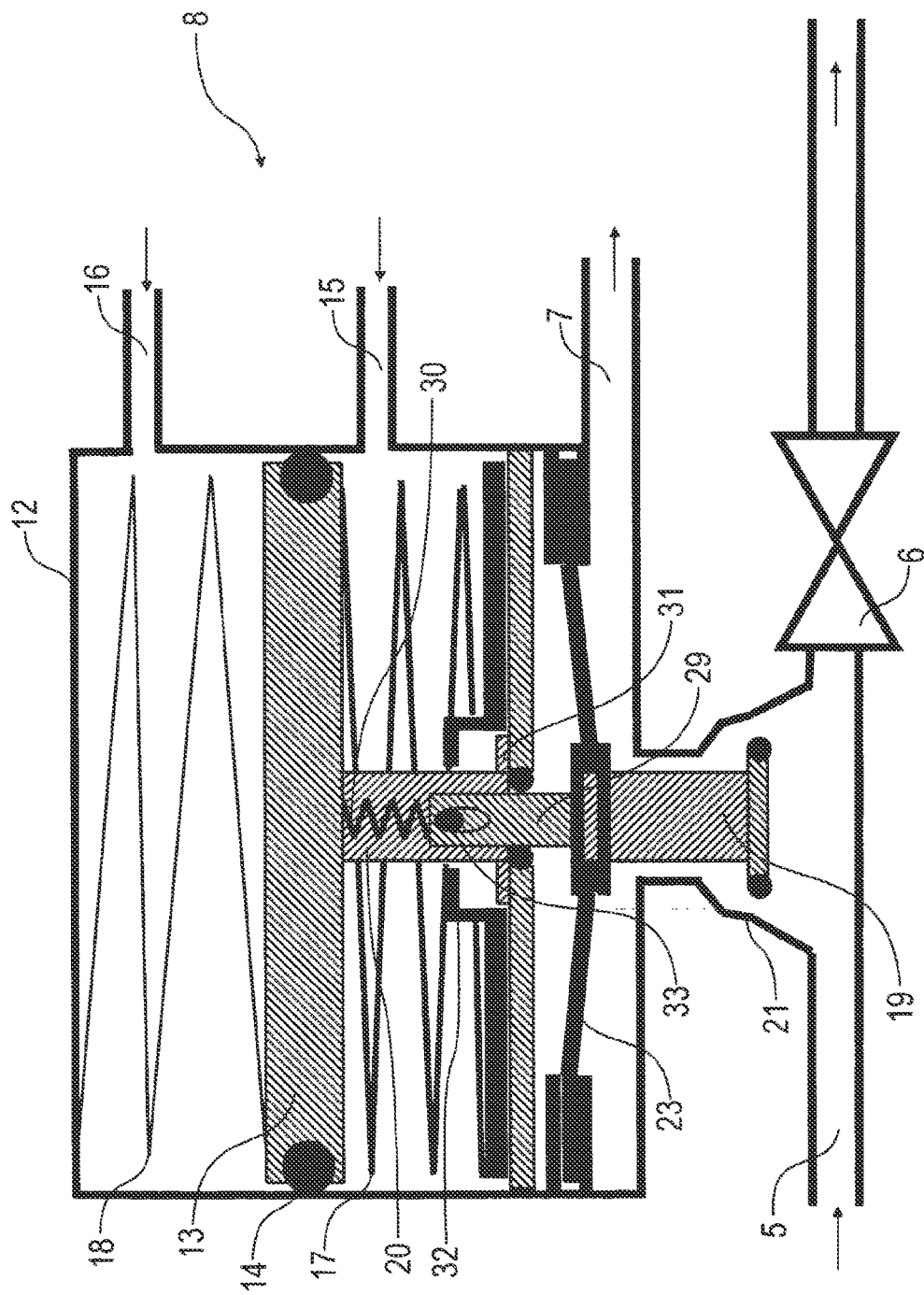

FLUID VALVE, IN PARTICULAR A RETURN VALVE FOR A PAINTING SYSTEM

CROSS-REFERENCES TO RELATED APPLICATIONS

This application is a Divisional of U.S. patent application Ser. No. 14/504,866 filed on Oct. 2, 2014, which is a Continuation of U.S. patent application Ser. No. 13/319,156 filed on Jan. 23, 2012, which is a National Stage application which claims the benefit of International Application No. PCT/EP2010/002763 filed May 5, 2010, which claims priority based on German Application No. DE 10 2009 020 064.9, filed May 6, 2009, each of which are hereby incorporated by reference in their entireties.

FIELD

The present disclosure relates to a fluid valve, e.g., a return valve, which serves in a painting system, for example during a color change to lead residual color, flushing agent, color foam, air and/or compressed air from a color line, a loading area, etc. into a return system and/or to stop the color flowing downstream autonomously from flowing away into the return system.

BACKGROUND

FIG. 13A shows a highly simplified form of a conventional painting system 1 for painting vehicle body parts, wherein the painting system 1 comprises as application device a rotary atomizer 2 with a bell cup 3, which produces a spray jet 4 of paint while operating. The rotary atomizer 2 is hereby supplied with the paint to be applied over a color line 5, a main needle valve 6 being located in the color line 5 which guides the flow of paint to the rotary atomizer 2 and which is opened during a coating process. Furthermore, the painting system 1 is fitted with a return line 7 in which a return valve 8 is located, wherein the return line 7 opens into a return system in order to capture residues remaining during a color change (for example flushing agent, residual color, color foam) and to dispose them economically.

When changing the color in the painting system 1, firstly the main needle valve 6 is closed whereby the flow of paint to the rotary atomizer 2 is interrupted. The return valve 8 is then opened and the color line 5 is cleaned using a flushing agent and compressed air (blasts of compressed air), the residues of the paint remaining in the color line 5 being led over the opened return valve 8 and through the return line 7 into the return system. Subsequently, the color line 5 is loaded (pressurized) with the new paint of the desired color, wherein the main needle valve 6 is still closed while the return valve 8 is opened. The loading can be stopped when no more color foam or compressed air comes out in the return line 7 downstream behind the return valve 8 but fresh color. This is recognized by the painting system 1, in this example by a light barrier which consists of a source of light 9 and an optical sensor 10, wherein the light source 9 and the sensor 10 are located on opposite sides of the in this area transparent return line 7 so that the light barrier detects the transparency to light of the fluid coming out behind the return valve 8. During flushing the color line 5, a mixture of flushing agent, residual color and compressed air flows through the return line 7, this mixture being relatively transparent to light due to the high proportion of air in it. After loading of the color line 5, fresh paint appears at the outlet of the return valve 8 which contains hardly compressed air and is therefore relatively impervious to light. The sensor 10 is connected on the output side with a control unit 11 which closes the return valve 8 if the light barrier detects that fresh paint appears at the outlet of the return valve 8.

FIG. 13B shows a modification of the painting system 1 according to FIG. 13A which is different in that the return line 7 here branches off from the color line 5 downstream behind the main needle valve 6.

A disadvantage of the painting system 1 described above is firstly the fact that the return line 7 can get dirty during operation so that the light barrier can no longer detect the transparency to light of the flowing through fluid.

A further disadvantage of the conventional painting system 1 described above is the reaction time between reaction of the optical sensor 10 and closing the return valve 8, wherein fresh paint is led away over the return line 7 during the reaction time which leads to respective losses of color.

The conventional painting system 1 described above also needs additional components in the form of the source of light 9 and the optical sensors 10 to control the return valve 8, whereby the costs for manufacture and commissioning and also the fault liability increase.

Furthermore, it is also known from the prior art that return valve 8 can be actuated during a color change without a light barrier according to a prescribed time program. Here, the assumption is made that during a color change after a flushing operation, the fresh paint appears at a particular time in the return line 7 downstream behind the return valve 8.

A disadvantage of using this known control for the return valve 8 based on a time program is the fact that the time required during a color change for flushing and subsequent loading of the fresh paint depends on the viscosity of the paint so that a wrongly adjusted viscosity or fluctuations in the viscosity lead to inaccurate controlling of the return valve 8. If the return valve 8 is closed too late then fresh paint will be led over the return line 7 into the return system which is associated with corresponding losses of color. If, on the other hand, the return valve 8 is closed too early there will still be residues of the prior flushing operation in the color line 5 upstream before the return line 8 whereby the painting quality would be impaired after opening the main needle valve 6.

Accordingly, there is a need to appropriately improve on the conventional painting system 1 described above, in particular, with the option being provided to control the return valve 8 with the least possible effort and as precisely as possible when color is changed.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 14A is an enlarged cross-sectional view of a return valve similar to the return valve according to FIG. 9, the drawing showing the return valve in the loading (pressurizing) position, according to an exemplary illustration, FIG. 14C is the exemplary return valve according to FIGS. 14A and 14B in an opened flushing position to flush the color line, according to an exemplary illustration.

DETAILED DESCRIPTION

Figure 1:
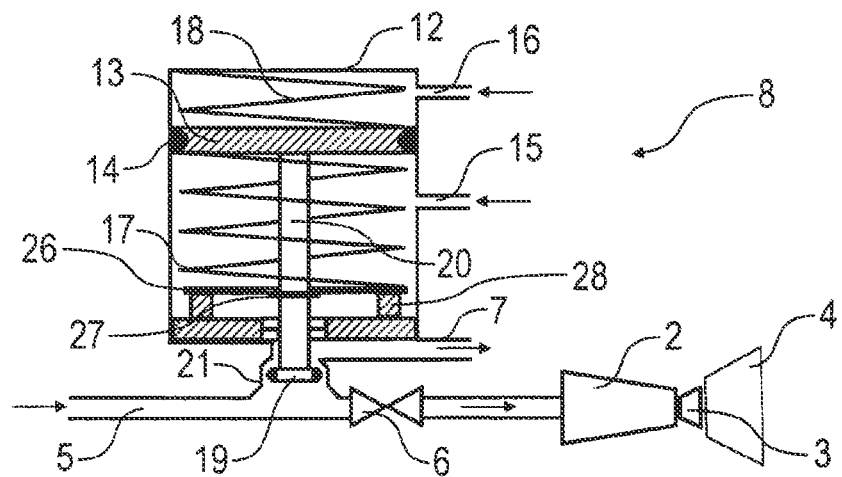
FIG. 1 is a schematic illustration of a return valve, according to an exemplary illustration, which switches at the end of a loading (pressurizing) process in response to a coating medium present in the valve, i.e., it's "own medium," which may actuate the return valve into the closing position.

The present disclosure includes the general technical teaching to use a fluid valve as return valve which is actuated by "own medium," i.e., a medium present in or flowing through the valve. In one exemplary illustration of a fluid valve actuated by an "own medium," a fluid valve used as a return valve is actuated in dependence on a fluid present at the inlet side, and may thereby switch to a closing position and/or influences the through flow behavior (e.g. the through flow behavior of a fluid such as (residual color, flushing agent, air and/or compressed air) through the valve. For example, the influenced through flow behavior can, merely as examples, include the fluid stream, the fluid flow, the fluid throughput, an opening position, a closing position and/or one or more positions between the opening position and the closing position. This means that controlling of the valve position is not achieved externally actuated by a valve drive, but by a property (e.g. viscosity) of the fluid present at the inlet side. This general technical teaching can furthermore also be used, for example, in order to activate a closing force amplifier, actuated by own medium, dependent on the fluid present at the inlet side, whereby a closing force amplification can be achieved and activated, respectively. Advantageously, a valve can be provided which can lead a first fluid (e.g. residual color, flushing agent, color foam and air (e.g. compressed air)) from a first line (e.g. a color line) and/or a first area (e.g. a loading area) self or own medium actuated into a second line (e.g. a return system) and/or can prevent a second fluid (e.g. color for the coating operation) self or own medium actuated from flowing away into the second line.

An exemplary fluid valve may have an opening position in which the fluid valve is at least partially open, in particular for flushing the color line with flushing agent and for loading (pressurizing) the color line with a new color during the color change.

An exemplary fluid valve furthermore may have a closing position in which the fluid valve is closed, e.g., for applying the new color after the color change.

The fluid valve may be adjustable between the opening position and the closing position, wherein the adjustment is actuated by the fluid present at the inlet side, and in another exemplary illustration, by it's own medium.

As part of the exemplary illustrations, the switching operation from the opening position into the closing position may be actuated by the fluid present at the inlet side, e.g., by it's own medium. It is however also possible that the switching operations are actuated or achieved in both directions by it's own medium. There is thus the possibility as part of the exemplary illustrations, that the fluid valve switches are actuated from the closing position into the opening position by it's own medium.

In one exemplary illustration, the fluid valve is a return valve in a painting system, e.g., as described above with regard to the prior art, to lead residual color, flushing agent, color foam and air or compressed air during a color change from the color line into a return system. In this example, the return valve may differentiate based on its construction between a first medium (e.g., a fluid) and a different second medium (e.g., another fluid), in particular between color on the one hand and air, compressed air, color foam containing air and flushing agent on the other hand, wherein the return valve switches, for example, autonomously and based on its construction into the closing position if there is a particular medium, in particular fresh color, on the inlet side of the return valve. It is also possible, that the valve differentiates based on its construction between a fluid (e.g. flushing agent, (residual) color, etc.) on the one hand and a gaseous medium (e.g. air and compressed air, respectively) on the other hand. An exemplary return valve, on the other hand, may advantageously switch autonomously and based on its construction into the opening position and/or remains at least in the opening position if there is air or compressed air or color foam at the inlet side of the return valve. This own medium actuated controlling of the return valve allows dispensing of an external valve drive and a complex sensory system needed to differentiate between the fresh paint on the one hand and flushing agent, residual color and air and compressed air, respectively, and color foam on the other hand. The exemplary illustrations are not, however, restricted to the exemplary illustrations in which controlling of the fluid valve is exclusively own medium actuated. It is rather possible, as part of this the exemplary illustrations, that the own medium actuated controlling of the fluid valve can be combined with an external control which will be described in detail below.

Furthermore, the own medium actuated control can advantageously be used for achieving and activating, respectively, a closing force amplification. For example the fluid or return valve can be provided to autonomously and based on its construction activate a closing force amplifier (which will be described in more detail below), if there is color, e.g., a coating medium having a predetermine shading or color, at the inlet side of the fluid or return valve. It is furthermore possible to provide a fluid or return valve in such a way that it can autonomously and based on its construction activate and/or control an arrest mechanism (which will be described in more detail below), in particular unlock it, if there is color at the inlet side of the fluid or return valve, whereby a closing force amplification can be achieved and activated, respectively.

In one exemplary illustration, the fluid valve switches due to its own medium actuated controlling dependent on the viscosity of the fluid present at the inlet side in the closing position. Fresh paint which arrives at the return valve during loading (pressurizing) may have a higher viscosity than the air-containing color foam which arises during flushing the color line, thereby facilitating detection of a change in fluid viscosity. There is also the possibility, as part of the exemplary illustrations, that the fluid valve switches between the opening position and the closing position dependent on other properties of the fluid present at the inlet side. For example the switching process of the fluid valve can be controlled by the mass density, the physical condition, the pressure expansion, the electrical conductivity, optical properties (e.g. permeability to light and color), heat conductivity, vibration behavior, magnetic permeability and/or by the pressure of the fluid present at the inlet side.

In one exemplary illustration, the fluid valve is opened to a maximum in the opening position so that the color line can be flushed with a maximum amount possible of the flushing agent stream. Furthermore, the fluid valve can have, in addition to the opening position, and the closing position a waiting position in which the fluid valve is at least partially open, for example for waiting for a new color while loading the new color. An exemplary fluid valve can be designed in such a way that it only switches from the waiting position, but not from the opening position, autonomously and by it's own medium actuated into the closing position, whereas for switching from the opening position an external control of the fluid valve is necessary.

With such a constructional design of the fluid valve with three switching conditions (opening position, waiting position and closing position) the fluid valve may, during a color change, be initially switched into the opening position so that the color line can be flushed with a maximum amount possible of the flushing agent stream as quickly as possible. At the end of the flushing process and therefore at the beginning of loading with the new color, the return valve may be switched from the opening position into the waiting position, and in one exemplary illustration this switching process may be achieved by an external valve control. At the end of the loading process fresh paint finally appears at the inlet of the return valve whereby the return valve is switched, e.g., by being actuated by it's own medium, from the waiting position into the closing position.

It was mentioned above that the exemplary illustrations are not restricted to a fluid valve which is exclusively controlled in an own medium actuated manner. Rather, the exemplary illustrations also include a fluid valve which is additionally controllable externally by an external valve drive, in particular external medium actuated (e.g. by compressed air).

An exemplary fluid valve may therefore comprise first control input, e.g., a first control air connection over which control air can be fed to switch the fluid valve externally actuated into the closing position. The air and/or compressed air fed over the first control air connection can serve here to support the own medium actuated switching action of the fluid valve. There is also the possibility, however, that the fluid valve can be switched over the first control input into the closing position independently of the fluid present at the inlet side.

Furthermore, in some exemplary illustrations, a fluid valve may comprise a second control input over which the fluid valve can be switched externally actuated into the opening position. Also the second control input may be a second control air connection over which air and/or compressed air can be fed to control the fluid valve.

In one exemplary illustration, the fluid valve has a cylinder and a piston movable within the cylinder, wherein the piston is able to move a shut-off body between the closing position and the opening position. Furthermore the fluid valve in this exemplary illustration has a valve seat wherein the shut-off body closes the valve seat in the closing position, whereas the shut-off body opens and releases, respectively the valve seat in the opening position. The valve movement may be driven here by the piston which can be applied with air or compressed air on one side or on both sides. Furthermore the piston can also be applied with a spring force of a spring on one side or on both sides in order to set a desired neutral position.

Furthermore, in some exemplary illustrations the fluid valve can comprise a closing force amplifier which amplifies the own medium actuated closing force, for example so that the fluid valve closes as quickly and/or as securely as possible if during loading the fresh color fresh color appears at the return valve on the inlet side.

The closing force amplifier can, for example, operate external medium actuated, in particular by air and/or compressed air. It is, however, alternatively also possible that the closing force amplifier operates by means of a spring and/or preload mechanism, in particular produces the amplified closing force by the spring and/or a preload mechanism.

It is possible that the closing force amplifier includes an arrest mechanism which, for example, can create an arrest with a bearing or support part (e.g. a bearing or stop plate, an abutting ring, etc.) located in the fluid valve. The bearing part may have a central opening and may be provided, for example, to create a bearing portion, support portion and/or arrest portion at the peripheral edge and/or adjacent to the central opening. The bearing part may advantageously be fastened on a wall of the cylinder and/or a housing of the fluid or return valve.

In one exemplary illustration, the arrest mechanism is switchable or controllable, in particular lockable and/or unlockable. In this example, the arrest mechanism (or the arrest) can be controlled or switched own medium actuated dependent on the fluid present at the inlet side, in particular unlocked, in order to achieve or activate the closing force amplification and/or in order to achieve the closing position or to allow the fluid or return valve to move into the closing position.

It is thus advantageously possible that the closing force amplifier is activated by a fluid (e.g. fresh color, paint, etc.) present at the valve (for example at the shut-off body of the valve) and/or the arrest mechanism is unlocked, in order to achieve a closing force amplification or to activate it, in particular in that by the unlocking a spring and/or preload mechanism (e.g. a coil or pressure spring) is released or relieved, whereby the shut-off body can be pressed with closing force amplification against the valve seat.

In one exemplary illustration, the arrest mechanism can be designed as a snap connection mechanism, a latch connection mechanism and/or a clamping connection mechanism.

For a pneumatic closing force amplifier the closing force amplifier may comprises an amplifier valve which selectively opens or closes the first control air connection which opens into the cylinder and serves to close the fluid valve, wherein the closing force amplifier opens the amplifier valve if the own medium actuated control of the fluid valve leads to a slight closing of the fluid valve, whereupon the support force is initiated by the first control air connection and amplifies the closing force.

In one exemplary illustration of the closing force amplifier the amplifier valve is a sliding valve which comprises a valve slider which is coupled with the piston so that movement of the piston leads to a corresponding movement of the valve slider. The closing force amplifier is designed here in such a way that the valve slider closes the first control air connection if the piston of the fluid valve is in the opening position. This means that no force amplification acts when the fluid valve is in the opening position. The closing force amplifier is, on the other hand, designed in such a way that the valve slider releases the first control air connection if the piston has moved a fraction of its stroke from the opening position in the direction of the closing position so that the force amplification acts. During a closing movement of the fluid valve, the closing force support does not act yet in the opening position but only if the piston has moved slightly from the opening position in the direction of the closing position.

There is the option that the first control air connection, which serves to close the fluid valve, opens radially or axially into the lateral surface of the cylinder.

For an axial opening of the first control air connection in the cylinder, the first control air connection may be directly or indirectly closed or opened by the piston, wherein the opening mouth of the first control air connection has a smaller cross-section than the piston, wherein the ratio of the cross-sections defines the force amplification factor. The closing force amplification is based here on the principle that the air pressure applied to the first control air connection for a closed opening mouth of the first control air connection only acts on a relatively small area and therefore also only generates a relatively small force. After opening the opening mouth of the first control air connection the air pressure applied to the first control air connection does, on the other hand, act over the whole piston surface which is significantly larger than the opening mouth of the first control air connection so that also the closing force acting on the piston is respectively higher.

Furthermore there is the possibility, as part of the exemplary illustrations, that the closing force amplifier comprises a pressure controlled pilot valve, wherein the pilot valve connects a first control air line with the first control air connection of the fluid valve so that the pressure in the first control air line supports the closing movement of the fluid valve when the pilot valve is opened. The pilot valve is controlled here dependent on the fluid flowing in the feed line of the fluid valve. For this purpose, the pilot valve may comprises a control input which is connected with the feed line of the fluid valve so that the pilot valve opens when a pressure builds up in the feed line of the fluid valve at the end of the loading process.

In one exemplary illustration, the fluid valve is formed as a membrane valve and comprises an elastic membrane which carries a shut-off body. The shut-off body of the fluid valve connected with the membrane can be connected mechanically with a piston as it was already described above. The piston then allows external controlling of the fluid valve into the closing position and/or into the opening position.

There is also the possibility, as part of the exemplary illustration, that the fluid valve comprises a shut-off body, e.g., with a perforated disc, wherein slit-shaped holes can be located in the perforated disc. The size of the holes in the perforated disc is arranged in such a way that a certain closing force is generated dependent on the viscosity of the fluid present at the inlet side which leads to closing of the fluid valve when exceeding a certain viscosity limit.

Alternatively the own medium actuation of an exemplary fluid valve can be realized by providing only a small ring gap between the shut-off body and the surrounding valve seat in the opening position (and the waiting position, respectively). The gap width of the ring gap is set here in such a way that a pressure difference arises between the inlet side and the outlet side of the fluid valve dependent on the viscosity of the fluid flowing through, wherein the pressure difference acts on the shut-off body and generates a closing force.

If, for example, air flows through the fluid valve then the fluid valve only offers a small flow resistance despite the small ring gap so that the pressure difference between the inlet side and the outlet side of the fluid valve is low, which leads to a correspondingly small closing force. In this case the fluid valve remains in the opening position so that the air or compressed air at the inlet side can flow through nearly unhindered.

If, on the other hand, there is fresh paint flowing through the fluid valve then the small ring gap of the fluid valve offers a larger flow resistance due to the higher viscosity of the paint which leads to a correspondingly higher pressure difference between the inlet side and the outlet side of the fluid valve. The higher pressure difference between the inlet side and the outlet side of the fluid valve in turn generates a closing force whereby the fluid valve closes autonomously and/or the closing force amplification is activated.

Furthermore, in another exemplary illustration a fluid valve can comprise a position sensor which recognizes in which position the fluid valve is located (e.g. the opening position, the closing position and/or the waiting position or the loading position) in order to allow feedback, wherein the position sensor being able, for example, to operate pneumatically, electrically or opto-electronically. It is also possible that the sensor only queries or detects a particular position, in particular only the closing position.

Furthermore, there is the possibility, as part of the exemplary illustration, that the shut-off body of the fluid valve is connected by a rod or a mechanical compensation element with the piston, wherein the compensation element allows a play between the shut-off body and the piston. The play of the compensation element is may be larger here than the movement of the shut-off body from the opening position into the closing position so that the shut-off body can advantageously move from the opening position and/or from the waiting position into the closing position being actuated by it's own medium and/or without movement of the piston.

For this example with a compensation element for connection of the piston with the shut-off body, there may be an elastic membrane provided which moves the shut-off body in the area of play into the opening position or into the waiting position. The positioning movement of the membrane can take place here based on the own elasticity of the membrane and/or by means of a spring element (for example a coil spring). Furthermore, the membrane can also achieve a sealing function. For example, the membrane can be connected by means of a membrane holder with the rod and the compensation element, respectively.

The arrest mechanism can include an arrest element which is may be designed elastically in order to alter its original form when a force is applied to it, whereby, for example, unlocking, the closing position and/or the closing force amplification can be achieved and in order to return into its original form when the force is no longer applied, whereby, for example, locking, the waiting position, the opening position and/or a deactivation of the closing force amplification can be achieved.

The arrest element may have a base which is attached to the piston rod and at least one, and in some examples more than one, arrest lever which protrudes from the base. The arrest element can, furthermore, advantageously have at least one arrest portion for formation of an arrest. The arrest may be formed between the arrest portion and the bearing or support part (e.g., the bearing portion, support portion or locking portion of the bearing part and on the circumferential edge of the central opening, respectively).

Furthermore, the arrest element can include at least one switching portion (for example a beveled switching surface) for interaction with a switching element in order to achieve unlocking and/or locking of the arrest of the arrest portion. The arrest portion and/or the switching portion may be arranged in the area of the free end of the at least one arrest lever.

The arrest mechanism can further include a switching element (for example a beveled switching surface) for unlocking and/or locking of the arrest of the arrest portion. The switching element may be connected with the rod or the compensation element and/or is movable together with the rod or the compensation element. The switching element may be provided on the membrane holder which is located on the rod or the compensation element, but can, however, also be provided on the rod or the compensation element.

In one exemplary illustration the switching element and/or the shut-off body is provided, for example, to move from the waiting position and/or the opening position axially in the direction of the arrest element (or piston), in particular urged by the fluid present at the inlet side and/or by the closing force amplifier in order to achieve the closing position and/or the closing force amplification and/or in order to unlock the arrest of the arrest portion or to deform the arrest element from its original form, e.g., radially inwards.

Furthermore the switching element and/or the shut-off body may be provided, for example, to move from the waiting position and/or the closing position axially away from the arrest element (or piston), in particular urged externally actuated (for example by air or compressed air) over the second control input in order to achieve the waiting position and/or the opening position and/or in order to lock the arrest of the arrest portion or to bring back the arrest element into its original form, e.g., radially outwards.

In one exemplary illustration, the shut-off body may be provided on the free end of the rod or the compensation element.

The fluid valve can include a valve seat which has at least one conical portion and at least one cylindrical portion.

Furthermore the fluid valve can include a shut-off body which has at least one conical portion and at least one cylindrical portion.

It is furthermore possible to seal off the shut-off body using a sealing means (for example a sealing ring such as an O-ring, and/or a sealing edge, merely as examples) or to apply a sealing means to it. The conical portion of the shut-off body may have a circumferential sealing edge or seal ring, in particular, in order to sealingly lay on the conical portion of the valve seat in the closing position.

The cylindrical portion of the shut-off body may be provided to form an axially extending ring gap in the waiting position but possibly also in the opening and/or closing position with the cylindrical portion of the valve seat, which has a substantially constant gap size or gap width over its axial extension and/or which runs coaxially and parallel to the piston rod, the rod and/or the compensation element. In one exemplary illustration, the diameter of the cylindrical portion of the shut-off body is greater than the diameter of the rod or the compensation element and/or smaller than the diameter of the cylindrical portion of the valve seat in order to form a ring gap.

In one exemplary illustration the cylindrical portion of the shut-off body is located at the free end of the shut-off body, whereas the conical portion of the shut-off body can be located, for example, between the rod or the compensation element and the cylindrical portion.

In another exemplary illustration the shut-off body includes a first conical portion, a second conical portion and a cylindrical portion, wherein the cylindrical portion of the shut-off body is located between the first conical portion and the second conical portion of the shut-off body, whereas the first conical portion, for example, can be located between the rod or the compensation element and the cylindrical portion and the second conical portion on the free end of the shut-off body.

The arrest element, the bearing part and/or the membrane holder can be made out of metal, e.g., stainless steel, in particular hardened steel.

It should also be mentioned that the exemplary illustrations are not restricted to the fluid valve described above as an individual component. Rather, the exemplary illustrations are also directed to a complete painting system with an exemplary return valve in order to lead the paint residues arising during flushing a return line during a color change of the painting system over a return line into a return system, from where they can be disposed of economically.

There is also the possibility as part of the exemplary illustrations, to integrate the own medium actuated loading-stop-function into a main needle valve of an atomizer. In this way loading would be possible over the main needle for atomizers without a return system.

The exemplary illustrations also includes a color changing method with at least one of the following method steps or operating phases:

Painting with feeding the paint over the paint line.

Flushing the paint line over the return valve in the return line.

Flushing the painting components and the main needle duct (main needle, nozzle, air cap or bell cup).

Loading-stop valve is brought into the waiting position. This operating phase can overlap in time with operating phase c).

Filling (loading) of the color line up to the return valve (loading-stop valve), wherein the return valve closes automatically if there is paint at its inlet.

Influencing own medium actuated onto the through flow behavior (in particular of a fluid through the valve, for example dependent on the fluid present at the inlet side).

Furthermore, the exemplary illustrations are also directed to use of any of the exemplary return valves in a painting system.

Figure 13A:
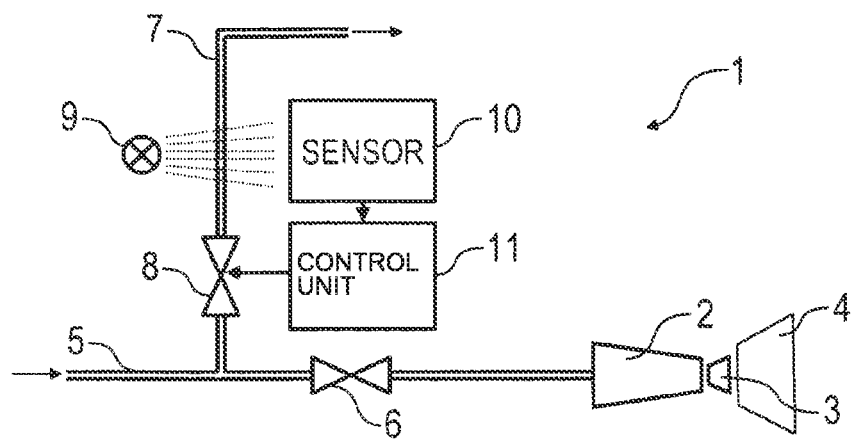
FIG. 13A is a schematic illustration of a conventional painting system with a return line.
Figure 13B:
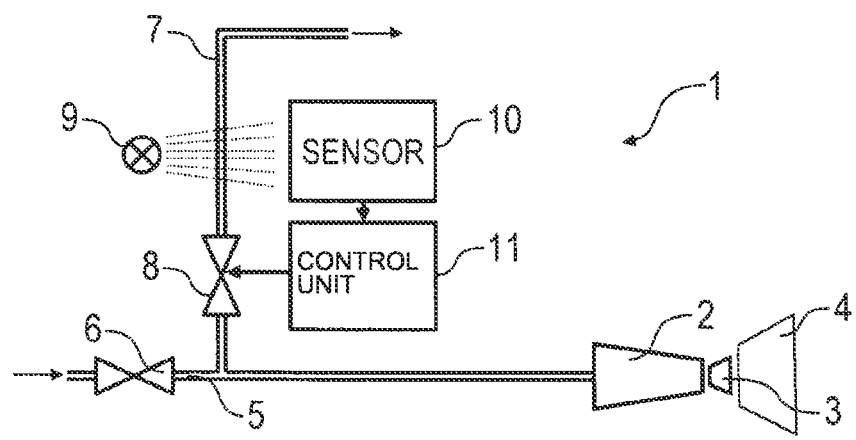
FIG. 13B is a schematic illustration of another conventional painting system.

The exemplary illustrations in accordance with FIG. 1 partially corresponds with the conventional painting system described above shown in FIG. 13 so reference is made to the above description, wherein the same reference numbers are used for corresponding details to avoid repetition.

The return valve 8 is fitted here with a cylinder 12 in which a piston 13 is movable, the piston 13 being sealed against the inner wall of the cylinder 12 by a seal 14, which allows compressed air controlling of the piston 13. For this purpose the return valve 8 has two compressed air connections 15, 16, wherein the compressed air connection 15 opens under the piston 13 into the cylinder 12 and allows a pneumatic externally actuated closing of the return valve 8, whereas the compressed air connection 16 opens above the piston 13 into the cylinder 12 and allows a pneumatic externally actuated opening of the return valve 8.

Furthermore, the return valve 8 may be fitted with two coil springs 17, 18, the upper coil spring 17 being weaker than the lower coil spring 18.

The upper coil spring 18 resets with its upper side on the inner end face of the cylinder 12 and presses axially from above against the piston 13.

The under coil spring 17 rests with its lower side on a stop plate 26 and presses from below axially upwards against the piston 13, the stop plate 26 having a central bore in the middle to pass through a piston rod 20.

The piston rod 20 may be fitted on its lateral surface with a collar-like driver 27 which impacts against the stop plate 26 from below and takes the stop plate 26 upwards with it when the piston rod 20 is moved from the waiting position shown upwards into the closing position.

In the waiting position shown in the drawing the stop plate 26 rests with its lower side on a ring-shaped support 28.

Furthermore, the return valve 8 is fitted with a shut-off body 19 which is connected over a valve needle 20 with the piston 13 so that the movement of the piston 13 is transferred to the shut-off body 19. The shut-off body 19 sits here in a valve seat 21, wherein in the opening position shown in the drawing of the return valve 8 there is a small ring gap between the shut-off body 19 and the valve seat 21.

The ring gap between the shut-off body 19 and the valve seat 21 in this exemplary illustration is sized such that air or color foam arriving at the inlet side can pass through substantially unhindered, wherein no pressure difference arises between the inlet side and the outlet side of the shut-off body 19.

If, on the other hand, there is higher viscous color on the inlet side at the return valve 8 then the flow of the paint through the ring gap between the shut-off body 19 and the valve seat 21 is hindered due to the low cross-section of the ring gap, whereby a pressure difference arises between the inlet side and the outlet side of the shut-off body 19. This pressure difference between the inlet side and the outlet side of the shut-off body 19 in turn generates a closing force on the shut-off body 19 so that the shut-off body 19 is moved from the waiting or opening position shown in the drawing upwards into the closing position and the return valve 8 closes.

Furthermore, the return valve 8 can also be moved externally controlled into the closing position by applying the control connection 15 with compressed air.

Furthermore, the return valve 8 can be opened again by applying the upper control connection 16 with compressed air.

Figure 2:
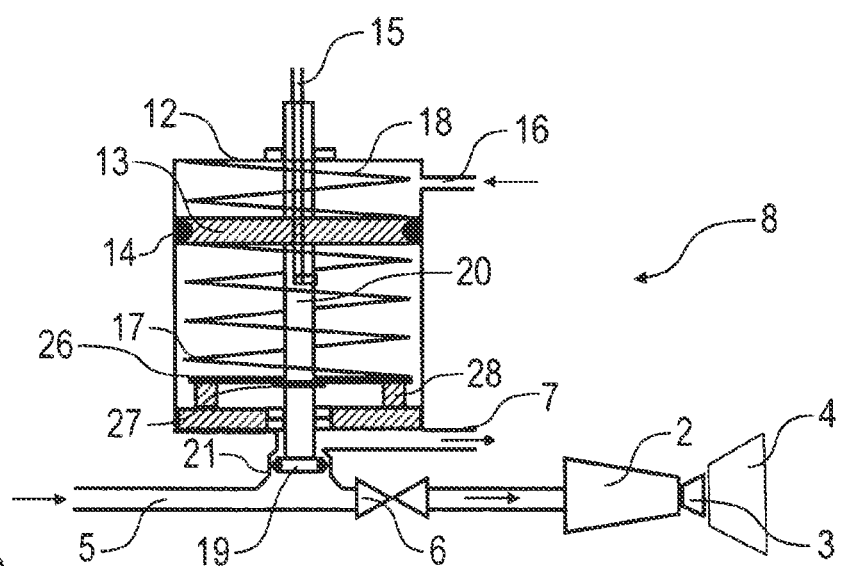
FIG. 2 is a modification of the exemplary return valve according to FIG. 1, for which the control air is fed through the valve needle for externally actuated closing of the return valve.

The exemplary illustration as shown in FIG. 2 corresponds extensively with the above-described exemplary illustration shown in FIG. 1, so that reference is made to the above description, wherein the same reference numerals are used for corresponding details to avoid repetition.

One special feature of this exemplary illustration is that the control connection 15 for closing the return valve 8 is passed coaxially through the valve needle 20.

Figure 3:
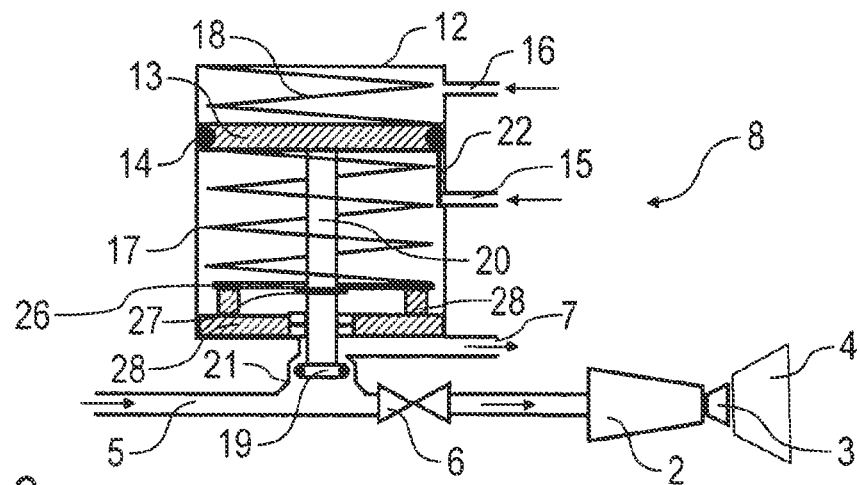
FIG. 3 is a modification of the exemplary return valve according to FIG. 1 with a pneumatic closing force amplifier, the closing force amplifier being fitted with a slide valve.

The exemplary illustration according to FIG. 3 partially corresponds with the above-mentioned exemplary illustration according to FIG. 1 so that reference is made to the above description, wherein the same reference numerals are used for corresponding details to avoid repetition.

One special feature of this exemplary illustration is that the return valve 8 in this exemplary embodiment is fitted with a closing force amplifier which amplifies the own medium actuated closing force. For this purpose the closing force amplifier has an amplifier valve which can selectively open or close the compressed air connection 15. The amplifier valve may substantially consist of a valve slider 22 which is attached on the outside to the underside of the piston 13 and which projects downwards over the opening mouth of the compressed air connection 15.

In the opening position shown in the drawing of the return valve 8, the valve slider 22 closes the opening mouth of the compressed air connection 15 so that the air pressure applied at the compressed air connection 15 does not act on the piston 13.

If, on the other hand, the shut-off body 19 has moved slightly upwards from the opening position shown in the drawing in the direction of the closing position due to the own medium actuation then the valve slider 22 frees the opening mouth of the compressed air connection 15 whereupon the compressed air applied at the compressed air connection 15 acts on the underside of the piston 13 and additionally pushes it upwards in the direction of the closing position.

Figure 4:
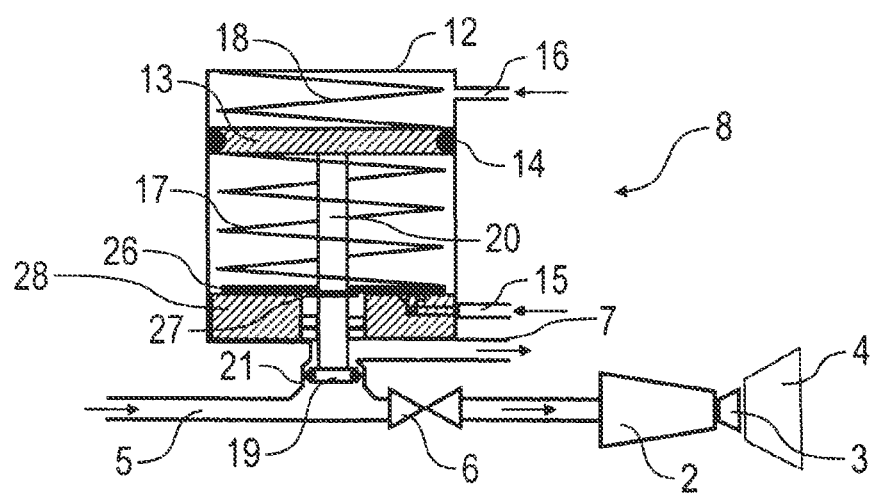
FIG. 4 is a modification of the exemplary return valve according to FIG. 3 with a different design of the closing force amplifier.

The exemplary illustration in accordance with FIG. 4 partially corresponds with the exemplary illustration described above shown according to FIG. 3 so that reference is made to the above description, wherein the same reference numerals are used for corresponding details to avoid repetition.

One special feature of this exemplary illustration is the constructional design of the closing force amplifier. The compressed air connection 15 opens from below axially into the cylinder 12, wherein the opening mouth of the compressed air connection 15 in the opening position shown in FIG. 4 is indirectly closed by the piston 13 so that only a relatively small force acts on the piston 13 since the opening mouth of the compressed air connection 15 only has a relatively small cross-section.

If, on the other hand, the piston 13 releases the opening mouth of the compressed air connection 15 during the beginning closing movement of the return valve 18 then the whole underside of the piston 13 suddenly is applied with pressure provided over the compressed air connection 15 whereby a significantly larger closing force arises. The force transmission ratio is determined here by the ratio of the cross-sections of the opening mouth of the compressed air connection 15 on the one hand and the piston 13 on the other.

Figure 5:
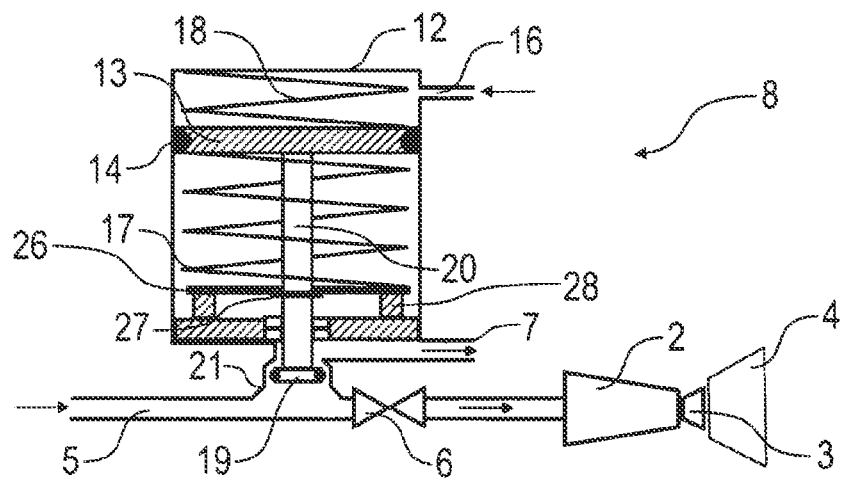
FIG. 5 is a modification of the exemplary return valve according to FIG. 1 with just one single control air connection which serves for externally actuated opening of the return valve.

The exemplary illustration as shown in FIG. 5 corresponds extensively with the above-described exemplary illustration illustrated in FIG. 1, so that reference is made to the above description, wherein the same reference numerals are used for corresponding details to avoid repetition.

One special feature of this exemplary illustration is that the compressed air connection 15 provided in FIG. 1 is not included. Therefore the exemplary illustration according to FIG. 5 does not allow externally actuated closing of the return valve 8 so that the closing movement is exclusively own medium actuated controlled.

Figure 6:
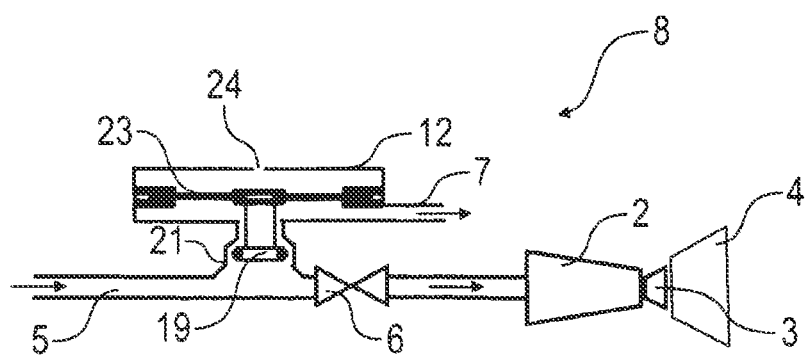
FIG. 6 is an alternative exemplary illustration of a return valve with a membrane.

FIG. 6 shows a fundamentally different example of a return valve, according to an exemplary illustration, that however also partially corresponds with the above described exemplary illustrations, so that reference is made to the above description, wherein the same reference numerals are used for corresponding details to avoid repetition.

One special feature of this exemplary illustration is that there is an elastic membrane 23 located in the cylinder 12, the shut-off body 19 being connected with the middle of the membrane 23 so that the membrane 23 generates an appropriate restoring force dependent on its deflection.

Furthermore, the cylinder 12 may have a compensation hole 24 on its upper side in order to allow pressure compensation during movement of the membrane 23.

Figure 7:
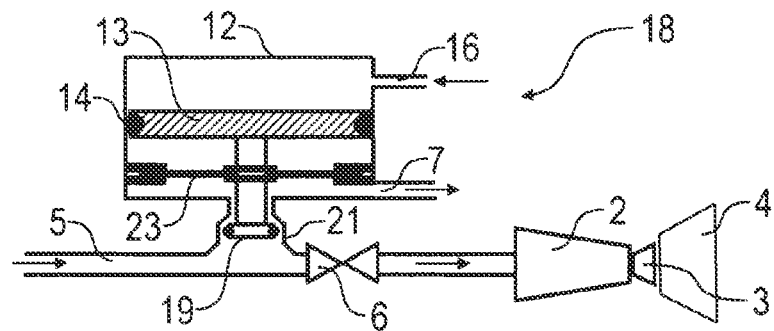
FIG. 7 is a modification of the exemplary return valve according to FIG. 6 with an additional piston for externally actuated opening of the return valve.

The exemplary illustration according to FIG. 7 is a combination of the exemplary illustrations according to FIG. 6 with the previous exemplary illustrations, so that reference is made to the above description, wherein the same reference numerals are used for corresponding details repetition.

One special feature of this exemplary illustration is that there is also the piston 13 as well as the membrane 23 located in the cylinder 12, the valve needle 20 connecting the shut-off body 19 with the membrane 23 and the piston 13. Therefore the shut-off body 19 in this case can thus be moved into the opening position by pressure application in a way which was described in detail above in that the compressed air connection 16 is applied with appropriate pressure.

Figure 8:
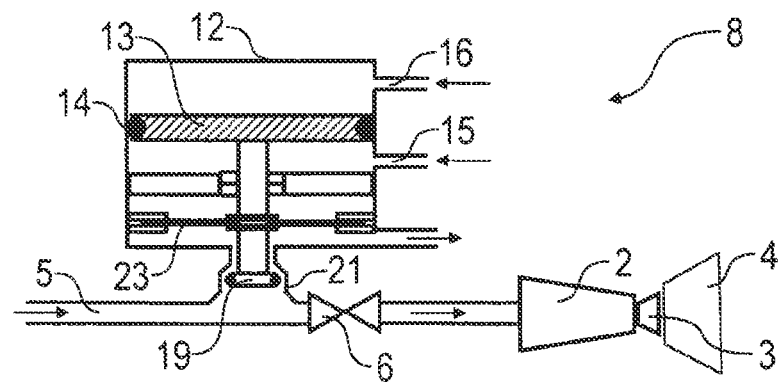
FIG. 8 is a further development of the exemplary return valve according to FIG. 7, it being also possible to arrange externally actuated pneumatic closing of the return valve.

The exemplary illustration according to FIG. 8 corresponds extensively with the exemplary embodiment according to FIG. 7 so that reference is made to the above description, wherein the same reference numerals are used for corresponding details to avoid repetition.

One special feature of this exemplary illustration is that additionally to the compressed air connection 16 for opening the return valve 8 also the compressed air connection 15 for closing the return valve 8 is provided.

Figure 9:
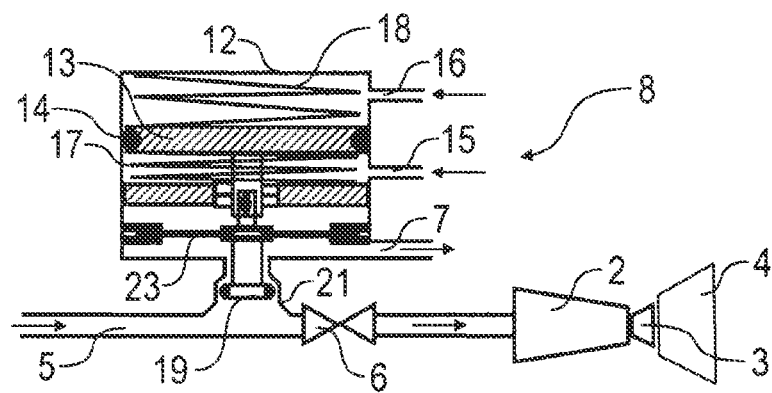
FIG. 9 is a modification of the exemplary return valve according to FIG. 8, the piston being connected over a compensation element with play with the shut-off body.

The exemplary illustration as shown in FIG. 9 corresponds extensively with the above-described exemplary illustration shown in FIG. 8, so that reference is made to the above description, wherein the same reference numerals are used for corresponding details to avoid repetition.

One special feature of this exemplary illustration is that the piston 13 is not connected rigidly with the membrane 23 and the shut-off body 19 but over a mechanical compensation element that allows mechanical play. This means that during the closing movement of the shut-off body 19 only the membrane 23 is moved whereas the play of the compensation element between the piston 13 and the membrane 23 prevents the piston 13 from also being moved. The play of the compensation element is therefore somewhat larger than the movement of the shut-off body 19 between the opening position and the closing position.

Figure 10:
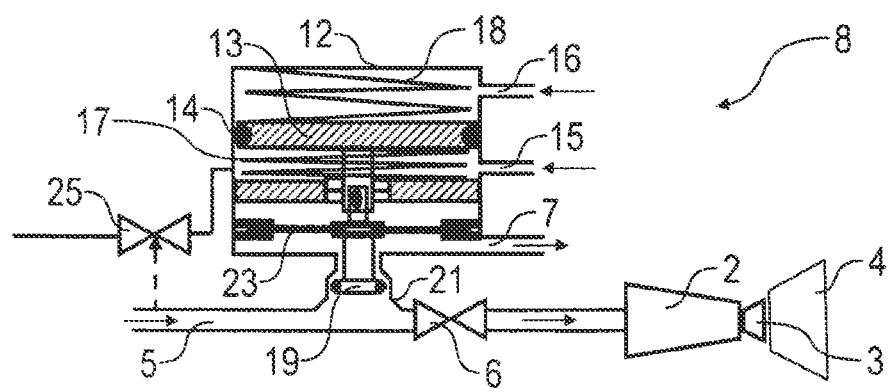
FIG. 10 is a further development of the exemplary return valve according to FIG. 9 with a pilot valve for externally actuated closing of the return valve.

The exemplary illustration as shown in FIG. 10 corresponds extensively with the above-described exemplary illustration shown in FIG. 9, so that reference is made to the above description, wherein the same reference numerals are used for corresponding details to avoid repetition.

One special feature of this exemplary illustration is that the underside of the piston 13 can be applied with compressed air over a pilot valve 25 in order to support the closing movement of the return valve 8. Actuation of the pilot valve 25 takes place in this case dependent on the pressure in the color line 5. The pilot valve 25 is therefore fitted with a control input which is connected with the color line 5.

If the pressure in the color line 5 increases at the end of the loading process because fresh paint is located in the color line 5 then the increasing pressure in the color line 5 ensures that the pilot valve 25 is opened, whereby the underside of the piston 13 is applied with pressure. In this way the own medium actuated closing force is amplified which leads to rapid closing of the return valve.

Figure 11:
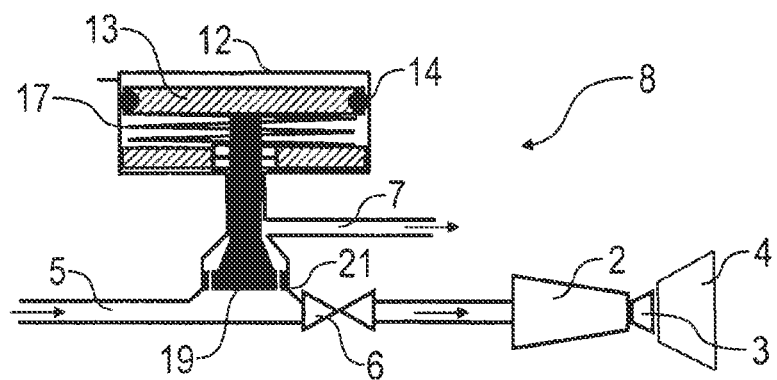
FIG. 11 is a modification of the exemplary return valve according to FIG. 7, the shut-off body having a perforated disc.

FIG. 11 shows another exemplary illustration of a return valve 8 that corresponds extensively with the above described exemplary illustrations, so that reference is made to the above description, wherein the same reference numerals are used for corresponding details repetition.

One special feature of this exemplary illustration is that the shut-off body 19 has a perforated disc, wherein the fluid must pass through the holes in the perforated disc.

FIGS. 12A-12D show various operating conditions of the exemplary return valves during a color change.

Figures 12A, 12B, 12C, 12D:
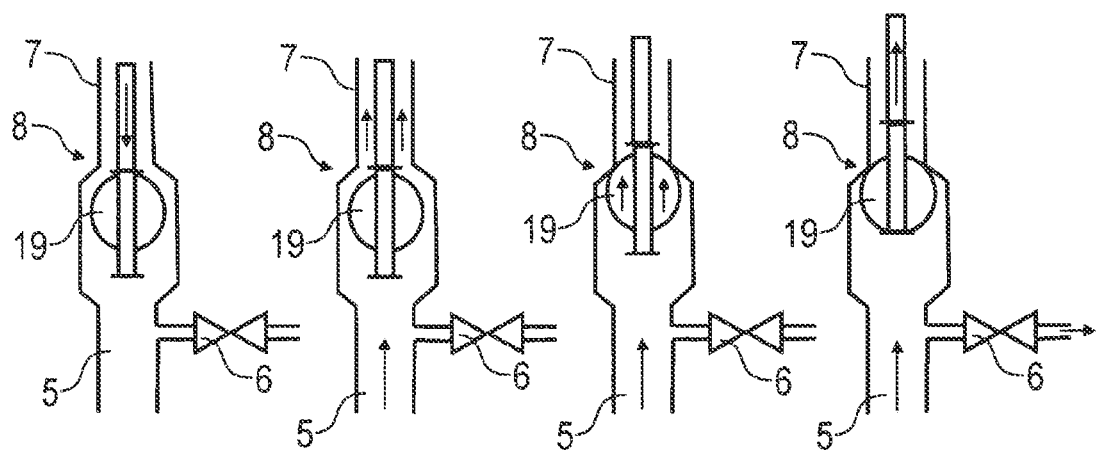
FIGS. 12A-12D are various operating conditions of the return valve, according to one exemplary illustration.

FIG. 12A first shows the position of the return valve 8 during flushing the color line 5. For this purpose the shut-off body 19 is pushed out of the valve seat pneumatically externally actuated in order to open the return valve 8. The residues made up of flushing agent, color foam, compressed air and residual air arising during the flushing can then be guided over the return line 7 into the return system.

FIG. 12B, on the other hand, shows the condition of the return valve 8 during loading of new color. The return valve 8 is then not pneumatically actuated so that the ball-shaped shut-off body 19 rests loosely in the valve seat and just allows air or color foam to pass through.

FIG. 12C, on the other hand, shows the condition of the return valve 8 at the end of the loading process when the color line 5 is already filled with fresh paint, which has a relatively high viscosity. The relatively high viscosity of the flowing in fresh paint results in the return valve 8 being closed own medium actuated in that the ball-shaped shut-off body 19 is pushed into its valve seat.

Finally, FIG. 12D shows the condition of the return valve during subsequent painting, after the previous loading process was ended. In this condition, the ball-shaped shut-off body 19 is pulled pneumatically externally actuated into the valve seat in order to securely close the return valve.

Figure 14B:
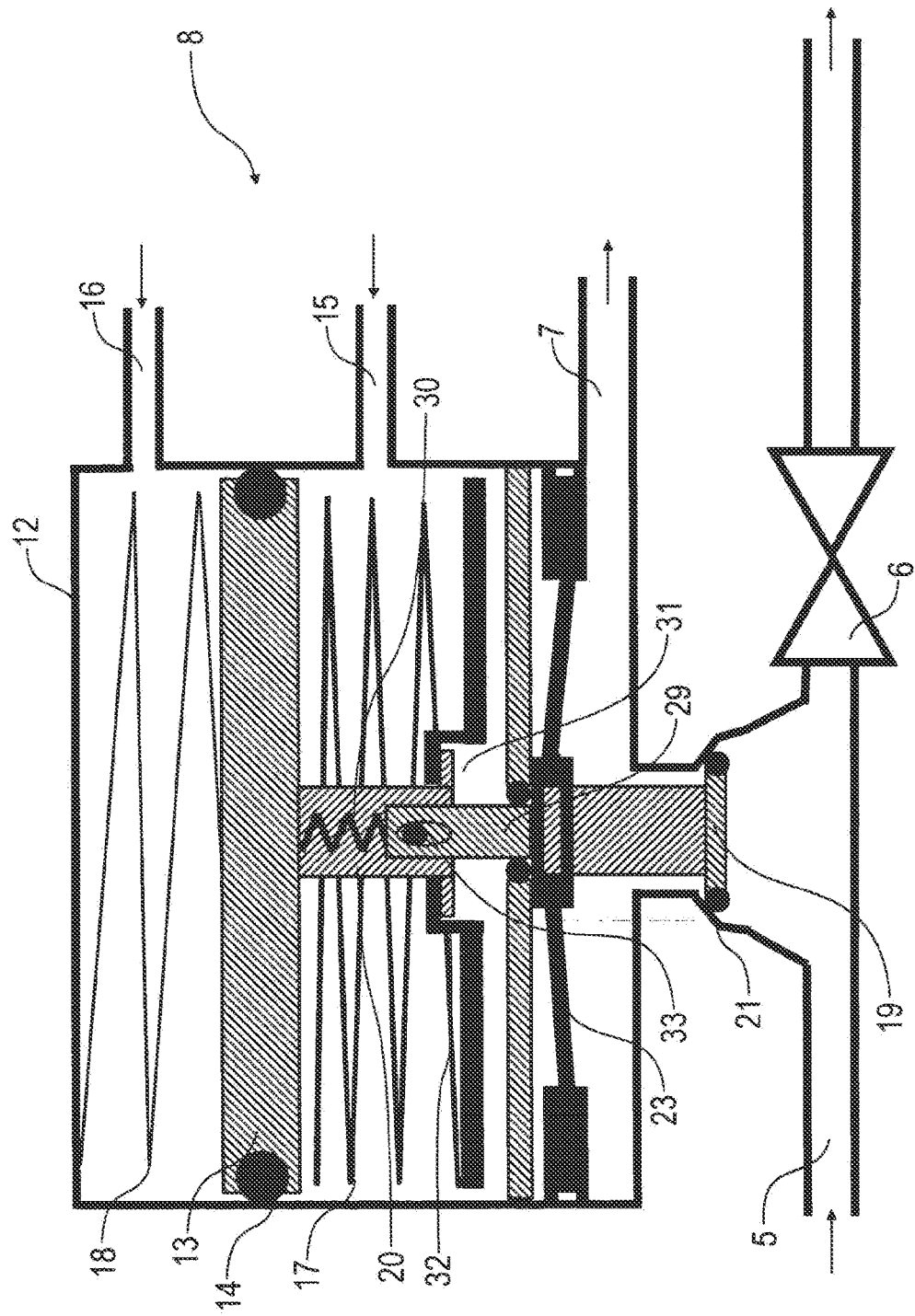
FIG. 14B is the return valve according to FIG. 14A in a closing position in which the return valve can be set by the color pressure present at the inlet side and/or actuated by compressed air, according to an exemplary illustration

The return valve 8 as shown in FIGS. 14A-14C corresponds extensively with the return valve illustrated in FIG. 9, so that reference is made to the above description, wherein the same reference numerals are used for corresponding details to avoid repetition.

In the enlarged illustration according to FIGS. 14A-14C one can also see that the piston rod 20 is hollow and has a central hole. A rod 29 can be moved axially in this central hole in the piston rod 20, wherein the rod 29 is firmly connected with the shut-off body 19 and clamped in a central opening in the membrane 23.

Furthermore, there may be a coil spring 30 located in the central hole of the piston rod 20 which supports on its upper side on the piston 13 and on its lower side on the upper end face of the rod 29. Thus the coil spring 30 and the membrane presses the piston 13 and the rod 29 and, therefore, also the shut-off body 19 axially apart. It is also possible, however, that just the membrane takes on the restoring function without the coil spring 30.

Furthermore, it should also be mentioned that there may be a ring-shaped circumferential, collar-shaped, stop 31 formed at the lower end of the piston rod 20 in order to limit the movement of the piston 13 upwards (it is not the movement of the piston 13 which is limited but rather that of the "package" lying between the piston 13 and a stop plate 32). To do this the return valve 8 is fitted with the stop plate 32, wherein the stop plate 32 has a central opening through which the piston rod 20 is led.

In the loading position according to FIG. 14A and in the closing position according to FIG. 14B the stop 31 lies with its upper side on the circumferential edge of the central opening in the stop plate 32 so that the piston 13 can not move any further upwards.

In the flushing position according to FIG. 14C the piston 13 with the piston rod 20 is, on the other hand, moved downwards so that the stop 31 does not lie on the stop plate 32. The stop 31 lies on the valve bottom in order to limit the valve movement downwards. In this position the stop plate 32 should lie on the valve bottom.

It is furthermore clear to see from the enlarged drawings according to the FIGS. 14A-14C that there is an elongated hole in the rod 29 in which a drive pin 33 engages which is connected to the piston rod 20. The geometry of the drive pin 33 and the elongated hole are matched with each other here in such a way that the elongated hole in the rod 29 offers mechanical play for the drive pin 33 so that the piston rod 20 and the piston 13 on the one hand and the rod 29 and the shut-off body 19 on the other hand have axial play.

In the following there will now be described the loading position of the return valve 8 shown in FIG. 14A. The loading position of the return valve 8 is set during a color change if the color line 5 was flushed and the color line 5 should be loaded with a new color up to the main needle valve 6.

In this loading position there is no control air being applied to the compressed air connection 15 and the compressed air connection 16, in order to actuate the piston 13. The position of the return valve 8 is then only determined by the interaction between the elastic membrane 23 and the coil springs 17, 18 and 30. Thus the membrane 23 places the rod 29 and thus also the shut-off body 19 in the neutral position shown in the drawing in which there is a ring gap between the shut-off body 19 and the valve seat 21 which allows that air initially fed over the color line 5 can escape over the return line.

The coil spring 17, on the other hand, presses the piston 13 and therefore also the piston rod 20 upwards until the stop 31 touches the stop plate 32.

Finally the coil spring 30 pushes the rod 29 axially opposite the piston 13 downwards.

In the following there will now be described the closing position of the return valve 8 shown in FIG. 14B, wherein the return valve 8 can be brought into the closing position selectively by the color pressure present at the inlet side or actuated by compressed air.

In the following there will first be described how the return valve 8 is brought during loading from the loading position shown in FIG. 14A into the closing position according to FIG. 14B due to color pressure present at the inlet side.

If during loading the new color not only air or color foam is fed over the paint line 5 but fresh color then the higher viscosity of the fresh color leads to a higher pressure on the shut-off body 19, which is pressed upwards against the elastic restoring force of the membrane 23. Here the mechanical play between the piston rod 20 and the rod 29 allows the piston 13 to remain in the same position as in the loading position shown in FIG. 14A.

FIG. 14C finally shows a flushing position of the return valve 8 in which the return valve 8 is opened independently of the fluid pressure present at the inlet side in order to allow the color line 5 to be flushed over the return line 7.

For this purpose the piston 13 is applied with compressed air over the compressed air connection 16 whereby the piston 13 is pressed axially downwards. The movement of the piston 13 in this case exceeds the mechanical play between the elongated hole in the rod 29 and the drive pin 33 in the piston rod 20. This results in the piston 13 with the piston rod 20 pushing the rod 29, and therefore also the shut-off body 19, downwards. The shut-off body 19 is thereby pushed out of the valve seat 21 whereby the return valve 8 opens.

Figure 15:
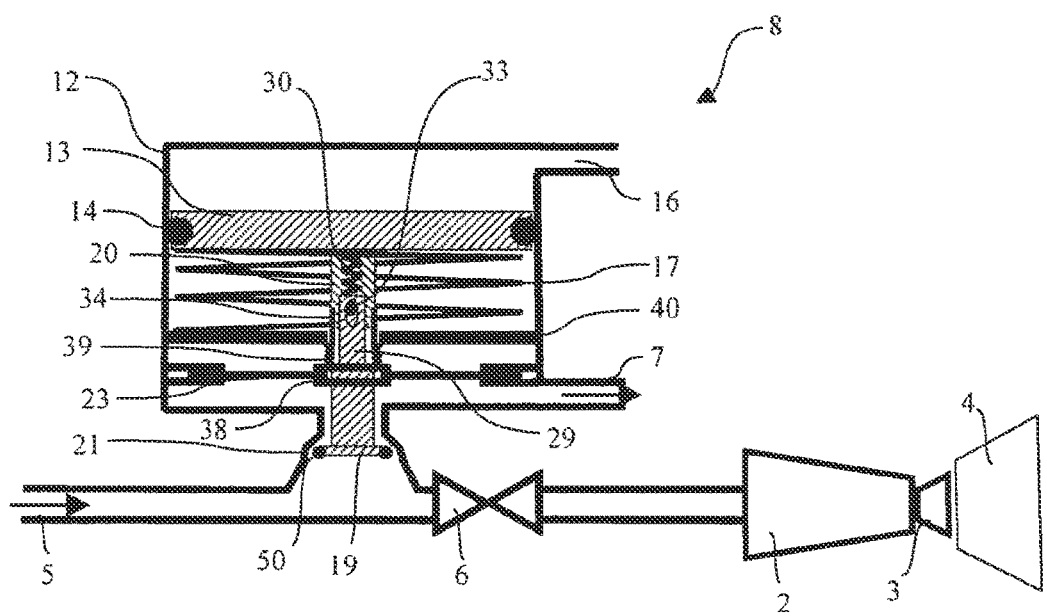
FIG. 15 is an alternative exemplary illustration of a return valve with closing force amplification in a loading/waiting position (without color actuation), according to one exemplary illustration.

FIG. 15 shows in turn another exemplary illustration of a return valve of the invention that also partially corresponds with the exemplary illustrations described above so that reference is made to the above description, wherein the same reference numerals are used for corresponding details to avoid repetition.

One special feature of this exemplary illustration includes, amongst other things, closing force amplification by means of an arrest mechanism. In particular, a closing force amplifier can be activated own medium actuated dependent on the fluid present at the inlet side in order to achieve the closing force amplification, e.g., in that the arrest mechanism is unlocked own medium actuated dependent on the fluid present at the inlet side in order to achieve the closing force amplification and/or in order to allow the fluid valve to assume the closing position.

Figure 16:
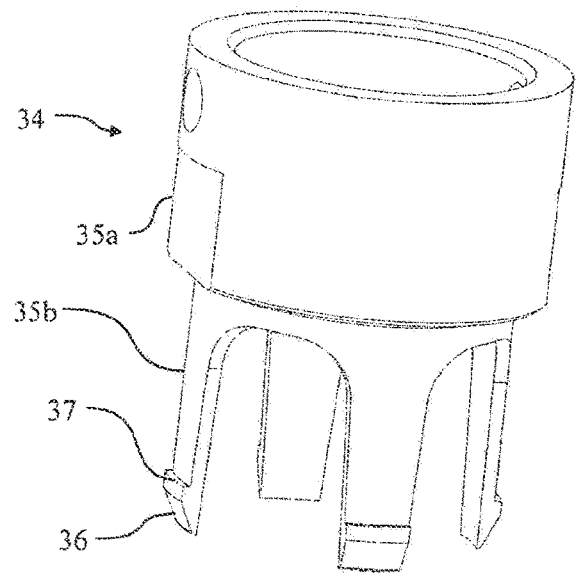
FIG. 16 is a perspective view of an arrest element of an arrest mechanism for a return valve according to FIG. 15, according to an exemplary illustration.

FIG. 15, in particular, shows in this respect that an arrest element 34 is arranged on the piston rod 20. Arrest element 34 includes a cylindrical base 35a which may be fastened coaxially on the piston rod 20 and, in one example, four locking levers 35b which protrude from the base 35a (FIG. 16). Each of the locking levers 35b has a switching portion, e.g., a beveled switching surface 36, and an arrest portion, e.g., a locking surface 37. The arrest portions 37 are intended to produce a lockable and unlockable arrest with a bearing part, stop part and/or support part 40.

The switching portions 36 are intended to cooperate with a switching element 39, whereby an unlocking and/or locking of the arrest can be achieved between the arrest portions 37 and the bearing part 40. The switching element 39 is therefore intended to cooperate with the switching portions 36 for unlocking and/or locking the arrest between the arrest portions 37 and the bearing part 40, in particular to move into engagement and out of engagement. The switching element 39 is connected with the compensation element and/or the rod 29. In particular, the switching element 39 is provided on a membrane holder 38 which is located on the compensation element or the rod 29. The switching element 39 may comprise a circumferential beveled switching surface which is located coaxially to the compensation element or the rod 29 and which is provided for interacting with the respective beveled switching surfaces of the switching portions 36. The 30 switching element 39 is provided to move together with the rod 29 or the compensation element and/or the shut-off body 19.

In particular, the arrest element 34 may be formed elastically by means of the protruding locking levers 35*b* in order to form a switchable (lockable/unlockable) snap, latch and/or clamping connection with the bearing part 40.

As can be further seen in FIG. 15, the bearing part 40 may have a central opening in the middle to pass through the arrest element 34 (in particular the locking levers 35*b* and/or the arrest portions 37), the piston rod 20 and/or the rod 29 or the compensation element. The bearing part 40 is furthermore fastened to an inner side of a wall of cylinder 12 or a housing wall of the fluid valve 8. The bearing part 40 may be provided so that the coil spring 17 can rest on the bearing part 40 with its lower side (in particular on the piston side, that is axially above in FIG. 15) and can push from below axially upwards against the piston 13 and/or to provide a bearing portion, support portion or arrest portion for the arrest portions 37 around the circumferential edge or adjacent to the central opening (on the shut-off body side, that is axially below in FIG. 15). The bearing part 40 can advantageously be structurally and/or functionally designed to be similar or even essentially identical to the stop plate 32. The bearing part 40 may be positioned between the membrane 23 and the coil spring 17 and/or the piston 13.

In general the closing force amplifier and/or the arrest mechanism according to FIG. 15 functions as follows: During loading of color, valve 8 is pneumatically pressureless in the loading or waiting position. The shut-off body 19 creates a small ring gap 50 to the valve seat 21. The arriving color displaces the air and the remaining air/flushing agent aerosol from the color ducts (from the color changer to the atomizer) through the loading gap 50 of the (paint stop) valve into the return line 7. Upon arrival of the color the shut-off body 19 is initiated to close by the stiffer color (without control sensor system and generally immediately). For secure operation during painting, upon arrival of the color at the shut-off body 19 the arrest mechanism is unlocked, whereby the spring-actuated closing force amplification is achieved, e.g., generated by the coil spring 17 which is located between the bearing part 40 and the piston 13.

During subsequent loading, the compensation element or the rod 29 is moved by the arriving color in FIG. 15 upwards. In this process the switching element 39, which is may be located on the membrane holder 38, moves the arrest levers 35*b* over the switching portions 36 radially inwards.

During the disengaging or unlocking of the arrest levers 35*b* or the arrest portions 37 from the bearing part 40, the coil spring 17 is relaxed and thereby the shut-off body 19 is pressed onto the valve seat 21 in a sealing manner.

FIG. 16 shows the arrest element 35 enlarged. The arrest element 35 comprises the cylindrical base 35*a* and the four arrest levers 35*b* projecting from it. Each of the arrest levers 35*b* has the switching portion 36 and the arrest portion 37.

FIG. 15 shows a cross-section of the return valve in a loading/waiting position (without actuation by color). The piston 13 is pressed upwards by the coil spring 17. The movement is, however, limited by the arrest levers 35*b* which are engaged by the arrest portions 37 with the bearing part 40 (locked). The arrest portions 37 therefore create an arrest with the bearing part 40, in particular with the circumferential edge of the central opening in the bearing part 40.

The drive pin 33 is positioned at the upper end of the elongated hole by means of the membrane or additionally by the coil spring 17. The shut-off body 19 is positioned in such a way that a loading or ring gap 50 is created between the valve seat 21 and the shut-off body 19.

Figure 17A:
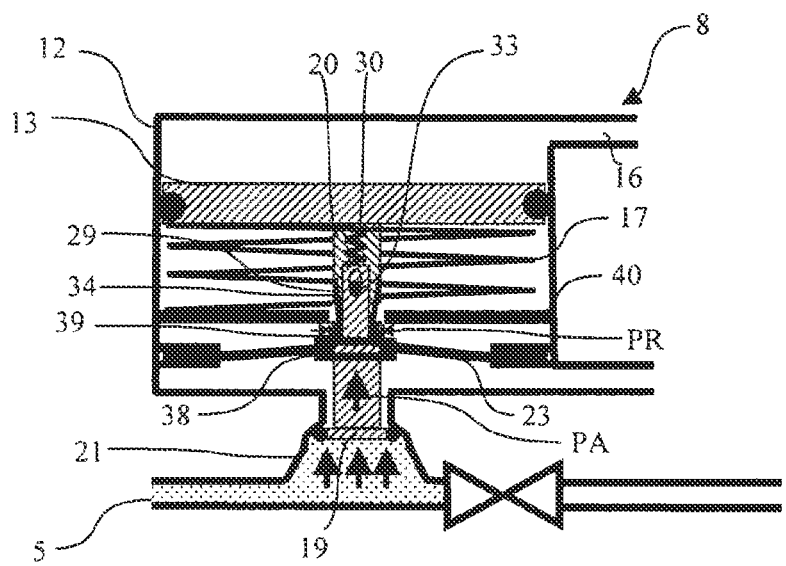
FIG. 17A shows the return valve according to FIG. 15 in a closing/painting position (with color actuation and closing force amplification), according to an exemplary illustration.

FIG. 17A shows a cross-sectional view of the return valve from FIG. 15 in a closing position (with actuation by color) or a painting position with closing force amplification. The switching element 39 on the membrane holder 38 is initially moved upwards by means of color fed over the color line 5. In this way the switching element 39 engages with the switching portions 36 of the arrest levers 35*b* in such way that the arrest levers 35*b* are pressed radially inwards PR, whereby the arrest between the arrest levers 35*b*, in particular the arrest portions 37, and the bearing part 40 is unlocked or released. In this way the piston 13 can be pushed upwards by the coil spring 17. The shut-off body 19 is initially impinged upwards by the color fed over the color line 5 and then more strongly impinged upwards by the closing force amplifier which generates the increased closing force by means of the coil spring 17 in order to advantageously achieve a tight and secure seal. The drive pin 33 is positioned at the lower end of the elongated hole by the color pressure.

It can, in particular, be seen through making a comparison of FIGS. 15 and 17A that the switching element 39 is provided to move from the waiting/loading position (FIG. 15) axially PA in the direction of the arrest element 34 in order to achieve the closing position (FIG. 17A) and/or the closing force amplification and/or in order to unlock the arrest of the arrest portions 37 with the bearing part 40, in particular in that the arrest element 34 is deformed radially inwards from its original form (FIG. 16).

Figure 17B:
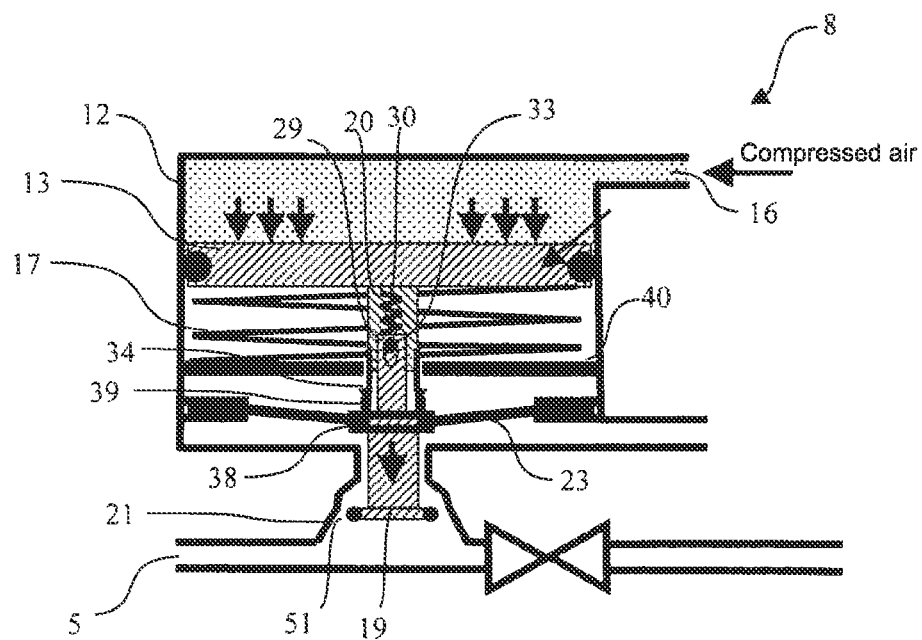
FIG. 17B shows the return valve according to FIG. 15 in a flushing position (with compressed air support), according to an exemplary illustration.

FIG. 17B shows a cross-sectional view of the return valve from FIG. 15 in a flushing position with compressed air support. The drive pin 33 is positioned at the upper end of the elongated hole. The piston 13 is pressed downwards by the compressed air fed over the compressed air connection 16. Furthermore the coil spring 17 is pressed together. Moreover, the shut-off body 19 is moved downwards whereby a flushing gap 51 is created between the shut-off body 19 and the valve seat 21. The arrest portions 37 do not create any arrest with the bearing part 40 in the flushing position, and are therefore not engaged with the bearing part 40. The arrest portions 37 are, in particular, spaced away from the bearing part 40 or displaced beyond the engaging position.

It can, in particular, be seen through making a comparison of FIGS. 15, 17A and 17B that the switching element 39 is provided to move from the closing position (FIG. 17A)

and/or the waiting/loading position (FIG. 15) axially in the direction away from the arrest element 34 in order to achieve the waiting/loading position (FIG. 15) and/or the opening position (FIG. 17B) and/or in order to create or lock the arrest of the arrest portions 37 with the bearing part 40, in particular in that the arrest element 34 can return to its original form (see FIG. 16).

Figure 18A:
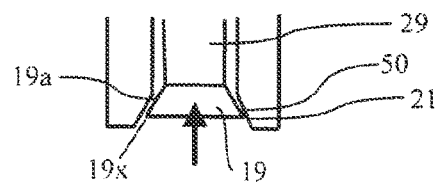
FIGS. 18A-18C are detailed views of various exemplary illustrations of valve seats, rods or compensation elements and shut-off bodies.
Figure 18B:
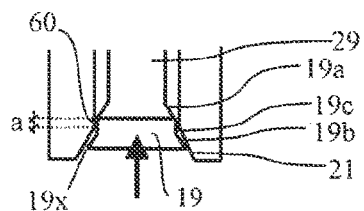
Figure 18C:
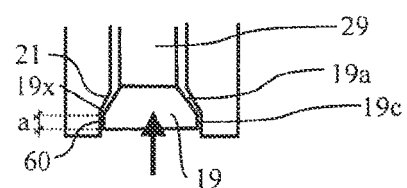

FIGS. 18A-18C show detailed views of various illustrations of valve seats, rods or compensation elements and shut-off bodies according to exemplary illustrations which partially correspond with the exemplary illustrations described above and can be provided for the valves described above so that reference is made to the above descriptions, wherein the same reference numerals are used for corresponding details to avoid repetition.

FIG. 18A shows a schematic enlarged view of an exemplary illustration in accordance with the axial gap principle, in particular of a modified rod 29 (or compensation element) and/or a modified shut-off body 19 in the area of the valve seat 21. The shut-off body 19 is shaped conically, e.g., widening towards the color line 5. Furthermore, the valve seat 21 includes a conical portion, e.g., widening towards the color line 5. The shut-off body 19 is at least partially located in the conical portion of the valve seat 21. The shut-off body 19 includes a circumferential sealing edge 19x. The circumferential sealing edge 19x lies in the closing position sealingly on the conical portion of the valve seat 21, wherein in the flushing and/or waiting/loading position, a loading or ring gap 50 is created between the sealing edge 19x and the conical portion of the valve seat 21. The sealing edge 19x shown in FIG. 18A is located at the free end of the shut-off body 19.

FIG. 18B shows a schematic enlarged view of an exemplary illustration in accordance with the radial gap principle, in particular another modified rod 29 (or compensation element) and/or another modified shut-off body 19 in the area of the valve seat 21. The shut-off body 19 comprises a first conical portion 19a, a second conical portion 19b and a cylindrical portion 19c, which is located between the first and the second conical portion 19a, 19b. The first conical portion 19a extends from the rod 29 or the compensation element to the cylindrical portion 19c, wherein the second conical portion 19b is located at the free end of the shut-off body 19. The first and second conical portion 19a, 19b widens respectively, e.g., towards the color line 5. The valve seat 21 comprises a cylindrical portion and a conical portion which may widen to the color line 5. The conical portion of the valve seat 21 is located at the free end of the valve seat 21, wherein the cylindrical portion of the valve seat 21 in FIG. 18B is located coaxially immediately above the conical portion of the valve seat 21. The diameter of the cylindrical portion 19c of the shut-off body 19 is larger than the diameter of the rod 29 or the compensation element. The cylindrical portion 19c of the shut-off body 19 is provided to form an axially extending ring gap 60 with the cylindrical portion of the valve seat 21 which has a substantially constant gap size or a constant gap width over its axial extension "a". The axially extending ring gap 60 may run coaxially and parallel to the piston rod 20, the rod 29 or the compensation element. The sealing edge 19x shown in FIG. 18B is located at the free end of the shut-off body 19.

FIG. 18C shows a schematic enlarged view of an illustration in accordance with the radial gap principle, in particular another modified rod 29 (or compensation element) and/or another modified shut-off body 19 in the area of a modified valve seat 21. The shut-off body 19 includes a conical portion 19a and a cylindrical portion 19c. The conical portion 19a is located between the rod 29 or the compensation element and 30 the cylindrical portion 19c, wherein the cylindrical portion 19c of the shut-off body 19 is located at the free end of the shut-off body 19. The conical portion 19a widens, e.g., towards the color line 5. The diameter of the cylindrical portion 19c of the shut-off body 19 is larger than the diameter of the rod 29. Furthermore, the valve seat 21 comprises a cylindrical portion and a conical portion which may widen towards the color line 5. The cylindrical portion of the valve seat 21 is located at the free end of the valve seat 21, wherein the conical portion of the valve seat 21 in FIG. 18C is located coaxially immediately above the cylindrical portion of the valve seat 21. The shut-off body 19 includes a circumferential sealing edge 19x. The circumferential sealing edge 19x lies in the closing position sealingly on the conical portion of the valve seat 21.

The cylindrical portion 19c of the shut-off body 19 is provided to form an axially extending ring gap 60 with the cylindrical portion of the valve seat 21 which has a substantially constant gap size or a constant gap width over its axial extension "a". The axially extending ring gap 60 may run coaxially and parallel to the piston rod 20, and/or the rod 29 or the compensation element. The sealing edge 19x shown in FIG. 18C is located axially behind the free end of the shut-off body 19.

In comparison with the illustration shown in FIG. 18A, the illustrations shown in FIGS. 18B and 18C may be more advantageous for certain applications since they generally provide better color pressure conditions. With the illustration shown in FIG. 18A it is possible that a part of the color pressure can also build up behind the shut-off body, thereby reducing the force for closing during a loading process.

In the case of the illustration according to FIG. 18B and, in particular, the illustration according to FIG. 18C, length tolerances of the valve components can be better compensated for by the longer way of the rod during a closing process with a constant gap size during this closing stroke (the advantage: a large rod and shut-off valve stroke, respectively, easier compliance with manufacturing tolerances). Based on the longer closing stroke it is also possible to achieve a secure and improved closing of the exemplary illustrations having a closing force amplifier.

Figure 19:
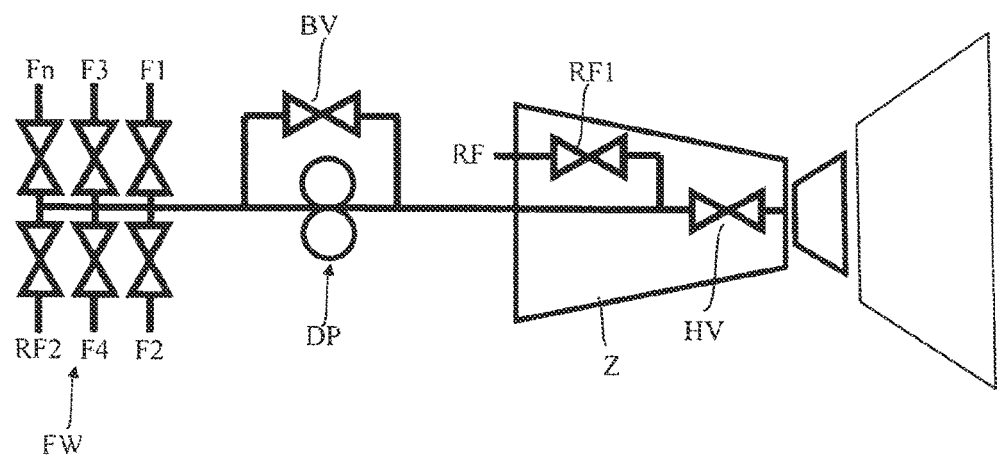
FIG. 19 shows installation positions of a fluid valve, according to an exemplary illustration.

An exemplary fluid valve for reduction of color losses, in particular for reduction of color loading losses after a color change, can be used advantageously at various positions. As shown in FIG. 19 for example in a color changer FW (see RF2 position), in a metering pump DP (e.g. instead of the position of the bypass valve BV), in an atomizer Z (see RF1 position), loading of special color supply systems and further applications, etc. Furthermore, the fluid or paint stop valve can be used in a pig station. The fluid or paint stop valve can, e.g., be used (in particular always) for bleeding color or coating agent channels during the loading of color and automatic closing upon arrival with the goal of reducing color losses or at best to avoid them. Furthermore, there is a multiplicity of other possible uses.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

References in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. Have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above, description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given in their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

LIST OF REFERENCE NUMERALS

1 Painting system
2 Rotary atomizer
3 Bell cup
4 Spray jet
5 Paint line
6 Main needle valve
7 Return line
8 Return valve
9 Light source
10 Sensor
11 Control unit
12 Cylinder
13 Piston
14 Gasket
15 Compressed air connection
16 Compressed air connection
17 Coil spring
18 Coil spring
19 Shut-off body
20 Valve needle and/or piston rod
21 Valve seat
22 Valve slider
23 Membrane
24 Compensation hole
25 Pilot valve
26 Stop plate
27 Driver
28 Support
29 Rod
30 Coil spring
31 Stop
32 Stop plate
33 Drive pin
34 Arrest element
35a Base
35b Arrest levers
36 Switching portion
37 Arrest portion
38 Membrane holder
39 Switching element
40 Bearing part, support part and/or stop part
50, 60 Ring/loading gap (waiting/loading position)
51 Ring gap (open/flushing position)
19a, 19b Conical portion of the shut-off body
19c Cylindrical portion of the shut-off body
19x Circumferential sealing edge of the shut-off body
FW Color changer
DP Metering pump
BV Bypass valve
RF Return system
HV Main needle valve
Z Atomizer

The invention claimed is:

1. A fluid valve for a paint system, the fluid valve switches between an opening position and a closing position, where a fluid flows through an inlet when the valve is in the opening position, the fluid valve comprising:
a cylinder having a piston movable therein, the piston being biased by a lower spring on a first side of the piston and biased by an upper spring on a second side of the piston;
a piston engaging with a piston rod, the rod including an elongated hole, the elongated hole receiving a spring, the piston and the piston rod facilitating movement of a shut off body wherein the shut off body moves between the opening position and the closing position based on the fluid viscosity on the inlet side.

2. The fluid valve according to claim 1, further comprising a shut-off body with a perforated disc.

3. The fluid valve according to claim 1, wherein the fluid valve autonomously and based on its construction activates a closing force amplifier if paint at the inlet side of the return valve is present.

4. The fluid valve according to claim 1, wherein the fluid valve autonomously and based on its construction switches an arrest mechanism to achieve closing force amplification if paint at the inlet side of the return valve is present.

5. The fluid valve according to claim 4, wherein the arrest mechanism includes an arrest element, the arrest element being at least partially elastic, the arrest element having a base fastened to the piston rod and at least one arrest lever projecting from the base, and the arrest element having at least one arrest portion for formation of an arrest of the arrest portion and at least one switching portion for cooperating with a switching element in order to achieve selectively unlocking and locking of the arrest of the arrest portion.

6. The fluid valve according to claim 5, wherein
a) the switching element is provided to move axially in the direction of the arrest element in order to achieve at least one of the closing position, the closing force amplification, and unlocking the arrest of the arrest portion in that the arrest element is deformed radially from its original form; and b) the switching element is provided to move axially in the direction away from the arrest element in order to achieve at least one of a waiting position, the opening position, and locking the arrest of the arrest portion in that the arrest element returns into its original form.

\* \* \* \* \*